United States Patent
Forehand et al.

(10) Patent No.: US 6,316,988 B1
(45) Date of Patent: Nov. 13, 2001

(54) VOLTAGE MARGIN TESTING USING AN EMBEDDED PROGRAMMABLE VOLTAGE SOURCE

(75) Inventors: Monty A. Forehand, Yukon; David R. Street, Oklahoma City, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/514,875

(22) Filed: Feb. 28, 2000

Related U.S. Application Data

(60) Provisional application No. 60/126,337, filed on Mar. 26, 1999.

(51) Int. Cl.[7] ................................. G05F 1/10; G05F 3/02
(52) U.S. Cl. ........................ 327/538; 327/543; 327/541; 323/283
(58) Field of Search ..................................... 327/538, 530, 327/540, 541, 543; 323/283, 284

(56) References Cited

U.S. PATENT DOCUMENTS

| | | | |
|---|---|---|---|
| 5,285,151 | * 2/1994 | Akama et al. | 324/158 R |
| 5,552,696 | 9/1996 | Trainor et al. | 323/275 |
| 5,631,547 | 5/1997 | Fujioka et al. | 323/273 |
| 5,696,729 | 12/1997 | Kitamura | 365/268 |
| 5,744,944 | * 4/1998 | Danstrom | 323/284 |
| 5,770,939 | 6/1998 | Edwards et al. | 322/28 |
| 5,774,734 | 6/1998 | Kikinis et al. | 713/300 |
| 5,856,740 | 1/1999 | Rau et al. | 323/233 |
| 5,907,237 | 5/1999 | Sekimoto | 323/282 |
| 5,919,262 | 7/1999 | Kikinis et al. | 713/300 |
| 5,936,388 | 8/1999 | Casper | 323/273 |
| 5,951,665 | 9/1999 | Crane, Jr. et al. | 710/126 |
| 6,094,367 | * 7/2000 | Hsu et al. | 363/78 |
| 6,144,606 | * 11/2000 | Pan | 365/226 |

* cited by examiner

Primary Examiner—Terry D. Cunningham
Assistant Examiner—Quan Tra
(74) Attorney, Agent, or Firm—Crowe & Dunlevy

(57) ABSTRACT

An apparatus and method for performing voltage margin testing in an integrated circuit device. The device is provided with an embedded voltage source having a voltage regulator which outputs a regulated analog voltage at a nominal magnitude, such as +3.3 volts. A voltage monitor provides an indication when the regulated analog voltage varies from the nominal magnitude by an output tolerance range determined as a first selected percentage of the nominal magnitude. An adjustment circuit applies a voltage regulator adjustment signal to the voltage regulator to adjust the regulated analog voltage by a second selected percentage of the nominal magnitude. The adjustment circuit further provides a voltage monitor adjustment signal to the voltage monitor to concurrently adjust the output tolerance range to a third selected percentage of the nominal magnitude different from the first selected percentage.

14 Claims, 5 Drawing Sheets

VOLTAGE MARGIN TESTING USING AN EMBEDDED PROGRAMMABLE VOLTAGE SOURCE

RELATED APPLICATIONS

This application claims priority to U.S. Provisional Application No. 60/126,337, filed Mar. 26, 1999.

FIELD OF THE INVENTION

This invention relates generally to the field of electronic devices, and more particularly, but not by way of limitation, to an embedded programmable voltage source that facilitates voltage margin testing in an integrated circuit device.

BACKGROUND OF THE INVENTION

Electrical devices permeate almost every aspect of modern society. Continued advancements in circuit integration has made possible numerous consumer products that were, for the most part, unimaginable even a few years ago.

Yet irrespective of complexity, electronic circuitry continues to require the supply of electrical power, usually in the form of source voltage in order to operate properly. At a basic level, the source voltage originates from an external source, either from an alternating current (AC) line voltage that is transformed and rectified, or a direct current (DC) voltage source device such as a battery pack.

Common source voltages used in electronic devices, such as computers and computer peripheral devices such as disc drives, include nominal voltage levels such as +5.0 volts or +3.3 volts. It is important to ensure that the source voltage or voltages supplied to electronic circuitry remain within specified tolerances to ensure proper operation of (and prevent damage to) the electronic circuitry. Voltage regulators have thus for many years been incorporated into the electronic circuitry of electronic devices to provide regulation of the source voltages to desired levels.

With increases in device complexity, system designers have increasingly employed voltage margin testing as a way to evaluate the robustness of new circuit designs. By adjusting the magnitude of the source voltage, the effects of various environmental conditions likely to be encountered by the device during normal consumer use can be evaluated. Moreover, some devices have been designed with some level of programmability so that, depending upon the requirements of a given application, an optimum magnitude of source voltage can be selected for use by the circuitry. Such adjustable voltage regulators are discussed, for example, by U.S. Pat. No. 5,770,939 and U.S. Pat. No. 5,774,734.

While operable, these and other devices fail to support real-time programmability and level detection, especially for circuits that are integrated into a single device. That is, while external voltage source levels supplied to the device can be readily adjusted up or down to simulate a range of real world voltage supply conditions, and the circuitry adjacent discrete voltage regulators can be manually manipulated to provide different voltage regulator outputs, at present there is no easy way to efficiently perform voltage margin testing in an integrated circuit device that internally incorporates voltage regulation circuitry.

SUMMARY OF THE INVENTION

The present invention provides an apparatus and method for performing voltage margin testing in an integrated circuit device, such as an application specific integrated circuit (ASIC) used in a disc drive.

In accordance with preferred embodiments, an ASIC device is provided with an embedded voltage source having a voltage regulator which outputs a regulated analog voltage at a nominal magnitude, such as +3.3 volts. A voltage monitor provides an indication when the regulated analog voltage varies from the nominal magnitude by an output tolerance range determined as a first selected percentage of the nominal magnitude, such as −10% of +3.3 volts.

An adjustment circuit applies a voltage regulator adjustment signal to the voltage regulator to adjust the regulated analog voltage by a second selected percentage of the nominal magnitude (such as −5% of +3.3 volts). The adjustment circuit further provides a voltage monitor adjustment signal to the voltage monitor to concurrently adjust the output tolerance range to a third selected percentage of the nominal magnitude different from the first selected percentage (such as −40% of +3.3 volts).

In this way, voltage margin testing can be readily performed on remaining circuitry internal to the device without inadvertently resetting the voltage source because of a detected undervoltage (or overvoltage) condition. Moreover, the realtime programmability of the voltage source allows the disc drive to adjust the analog voltage source to optimum levels in response to changing environmental conditions, such as changes in operational temperature.

These and various other features and advantages which characterize the present invention will be apparent from a reading of the following detailed description and a review of the associated drawings.

DETAILED DESCRIPTION

In order to set forth a detailed description of preferred embodiments of the present invention, it will be helpful to first briefly describe a particular environment in which such embodiments can be advantageously utilized.

Figure 1:
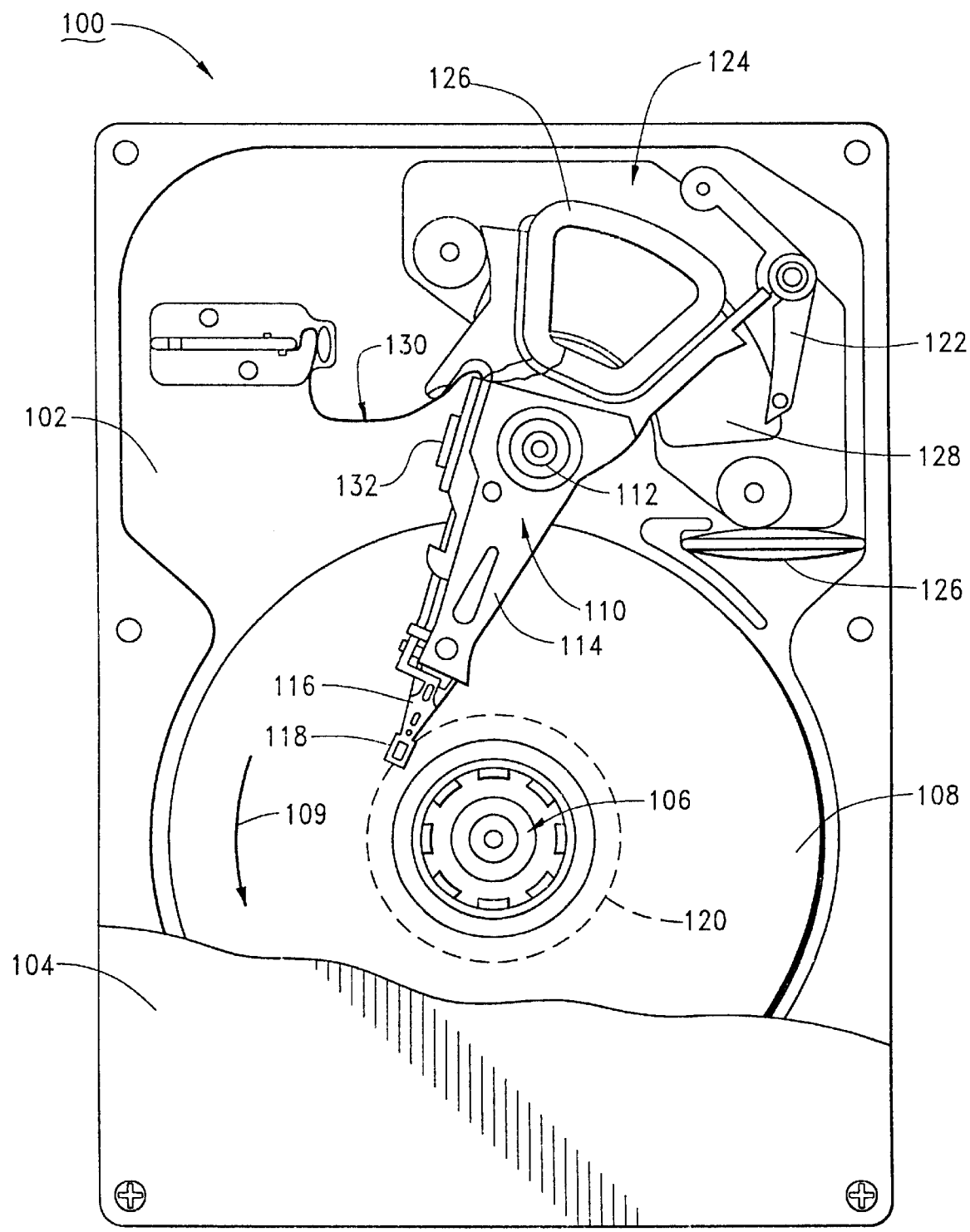
FIG. 1 provides a top plan view of a disc drive which provides an environment in which preferred embodiments of the present invention can be advantageously utilized.

FIG. 1 provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive 100.

A spindle motor 106 rotates a plurality of magnetic recording discs 108 at a constant high speed (in thousands of revolutions per minute) in an angular direction denoted by arrow 109. User data are written to and read from tracks on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116 to interface with the corresponding disc surfaces.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102, with the flex assembly 130 including a preamplifier/ driver circuit 132 (preamp) which electrically interfaces with the heads. The disc drive PCB houses the electronic circuitry used to control the operation of the HDA 101.

Figure 2:
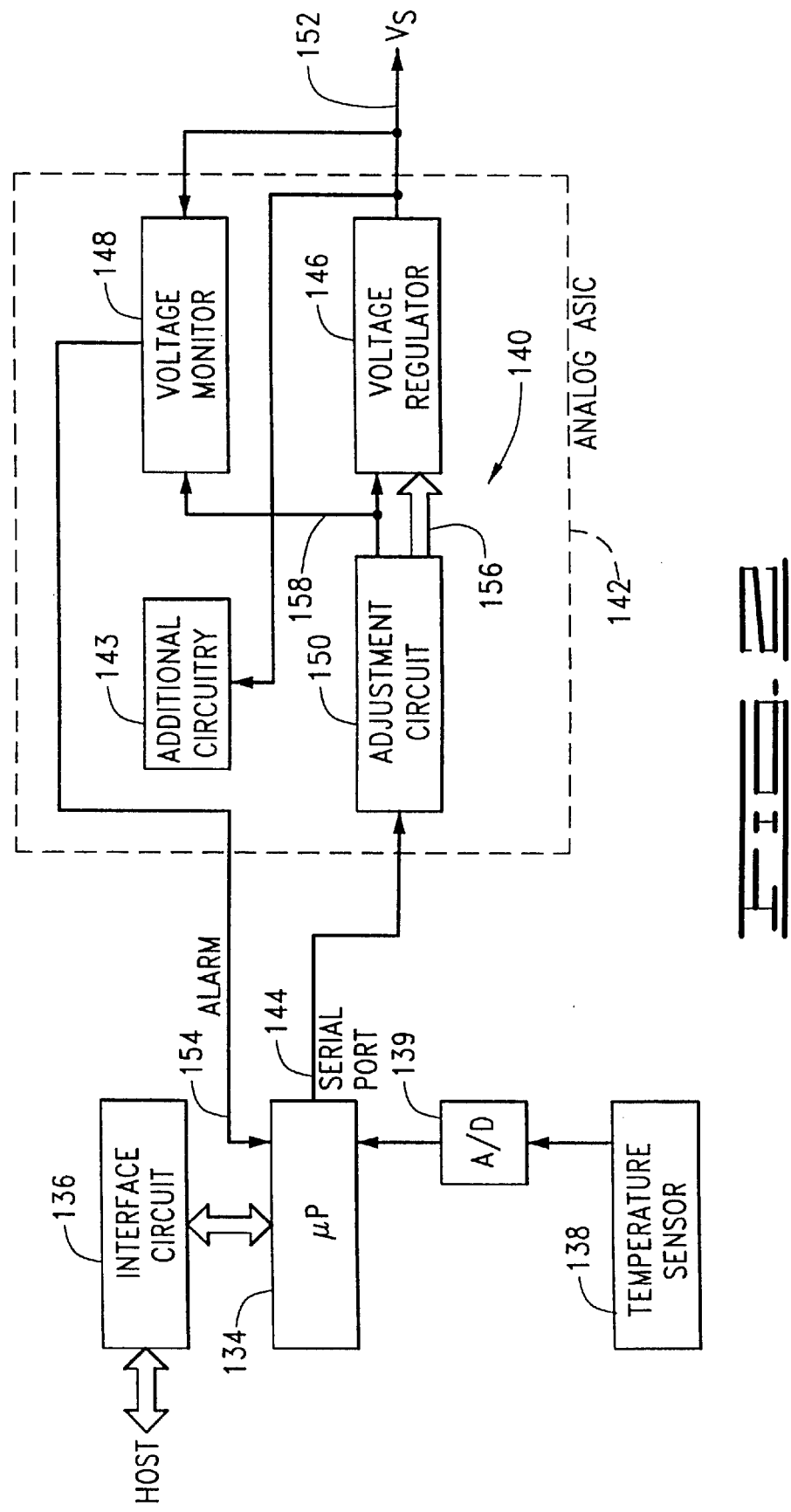
FIG. 2 provides a functional block diagram of an application specific circuit (ASIC) of the disc drive of FIG. 1, including a voltage regulator circuit, a voltage monitor circuit, and an adjustment circuit constructed in accordance with preferred embodiments of the present invention.

FIG. 2 provides a functional block diagram of relevant portions of the electronic circuitry of the disc drive PCB. A control processor 134 provides top level control of the disc drive 100. Communication with the host computer is provided through an interface circuit 136. An optional temperature sensor 138 provides temperature measurements which are provided to the control processor 134 via an analog to digital (A/D) converter 139.

A programmable voltage source circuit 140 ("voltage source") generates an analog regulated source voltage Vs to supply power to various circuits used by the disc drive 100. The voltage source 140 is preferably embedded in an analog application specific integrated circuit (ASIC, represented by dashed box 142). The ASIC 142 also houses additional circuitry used by the disc drive 100, such as motor driver circuitry used to control the spindle motor 106 and the VCM 124. This additional circuitry is generally represented at 143. The voltage Vs thus powers remaining circuitry disposed in the ASIC 142 as well as external circuits, such as the control processor 134, the interface circuit 136, and the preamp 132 (FIG. 1).

During normal operation, the voltage source 140 outputs the voltage Vs at a nominal magnitude, such as substantially +3.3 volts, and concurrently monitors the magnitude of the voltage Vs to ensure that the magnitude does not vary beyond an output tolerance range. The tolerance range is selected as a percentage of the nominal magnitude of the voltage Vs (such as ±10% of +3.3 volts).

The voltage source 140 is further configured to receive real-time voltage adjustment commands from the control processor 134 via a serial interface port on path 144. The commands can arise from internal programming steps executed by the control processor 134 or from external commands initiated by the host computer. In response to these commands, the voltage source 140 controllably adjusts the voltage Vs to selected percentages of the nominal magnitude, such as ±2%, ±5%, ±10% and ±15% of +3.3 volts. The adjustments in the voltage Vs can be made during design evaluation efforts to facilitate voltage margin testing of the disc drive electronics, which is particularly advantageous for evaluating the performance of the otherwise physically inaccessible circuitry within the ASIC 142. It is contemplated that the control processor 134 can further be programmed to issue voltage adjustment commands to the voltage source 140 to select an appropriate magnitude of the voltage Vs in response to changes in detected environmental conditions, such as various temperature levels detected by the temperature sensor 138.

The voltage source 140 comprises three primary circuits: a voltage regulator 146, a voltage monitor 148 and an adjustment circuit 150. The voltage regulator 146 receives an input voltage supplied to the ASIC 142 (not shown in FIG. 2), generates the regulated voltage Vs therefrom, and outputs the voltage Vs on path 152. The voltage monitor 148 monitors the magnitude of the voltage Vs and outputs an alarm signal on path 154 to the control processor 134 to provide an indication when the voltage Vs varies from the nominal magnitude beyond the acceptable output tolerance range. The alarm signal allows the control processor 134 to reset the voltage source 140 and take other remedial actions as appropriate in response to the detected "bad" voltage condition.

The adjustment circuit 150 preferably comprises a register configured to receive the voltage adjustment command as a multi-bit digital word. As explained in greater detail below, a portion of the input digital word forms a voltage regulator adjustment signal, which is passed from the adjustment circuit 150 to the voltage regulator 146 along path 156, causing the voltage regulator to adjust the voltage Vs accordingly. Another portion of the input digital word forms a voltage monitor adjustment signal, which is passed to the voltage monitor 148 along path 158 to concurrently adjust the output tolerance range used by the voltage monitor 148. The voltage monitor adjustment signal on path 156 also serves as a control input to the voltage regulator 146.

Figure 3:
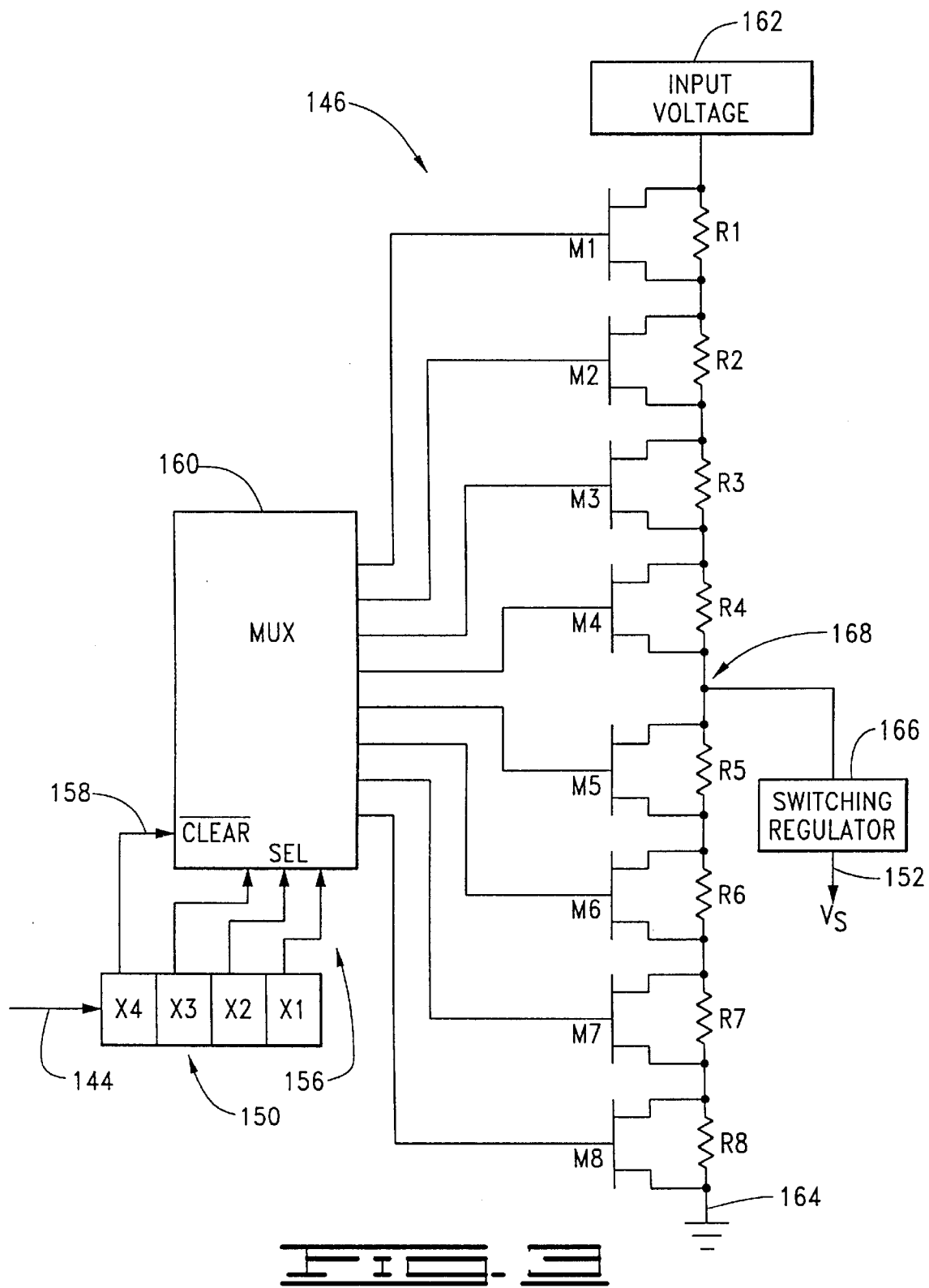
FIG. 3 is a generalized schematic diagram of a preferred embodiment of the voltage regulator circuit of FIG. 2.

FIG. 3 shows a preferred construction for the voltage regulator 146 and the adjustment circuit 150 of FIG. 2. The adjustment circuit 150 includes a four-bit register with cells X1, X2, X3 and X4, which store respective input digital command bits that are serially received from the control processor 134 (FIG. 3) via path 144. The command bits can each have a selected logic value of either 0 or 1 (low or high).

The voltage regulator 146 includes a multiplexor 160 with eight selectable outputs connected to gates of eight corresponding transistors M1 through M8, as shown. The transistors are individually connected in parallel across a voltage divider resistive network comprising eight corresponding resistors R1 through R8. The resistors are further serially connected between an input voltage source 162 and a ground terminal 164. A conventional switching regulator 166, preferably comprising a Buck convertor and associated filter network, generates the voltage Vs on the path 152 in relation to a setpoint voltage established at node 168 (between resistors R4 and R5).

The respective components of the voltage regulator 146 are selected so that, when current flows from the input voltage source 162 through all eight of the resistors R1–R8 to ground 164, the setpoint voltage at node 168 will be such that the voltage Vs generated by the switching regulator 166 is maintained at the nominal magnitude (e.g., substantially +3.3 volts). However, each of the transistors, when individually selected, provides a conductive path that bypasses the associated resistor. This effectively changes the voltage at node 168, resulting in an incremental adjustment in the magnitude of the voltage Vs from the switching regulator 166.

The respective values of the resistors R1–R4 are individually selected to provide preferred positive incremental adjustments in voltage Vs, such as +2%, +5%, +10% and +15%, and the values of the resistors R5–R8 are individually selected to provide preferred negative incremental adjustments in voltage Vs, such as –2%, –5%, –10% and –15%. Of course, other incremental adjustment values can readily be selected, including values that are not symmetric about the nominal magnitude of Vs.

The X1, X2 and X3 cells of the adjustment circuit 150 are collectively connected (via the path 156) to a selection input of the MUX 160, and the X4 cell is connected (via the path 158) to a clear input of the MUX 160. The eight possible logic combinations of the three bits in the X1, X2 and X3 cells (000 to 111) correspond to the eight outputs of the MUX 160. The clear input of the MUX 160 is active low. Thus, when the bit in the X4 cell goes high, the MUX 160 provides a high output on the respective output line corresponding to the selection input, activating the associated transistor M1–M8 and thereby bypassing the associated resistor R1–R8. When the bit in the X4 cell is low, no MUX output is selected and the voltage regulator outputs the voltage Vs at the nominal magnitude. It will be noted that the bits in the X1, X2 and X3 cells comprise the aforementioned voltage regulator adjustment signal.

Figure 4:
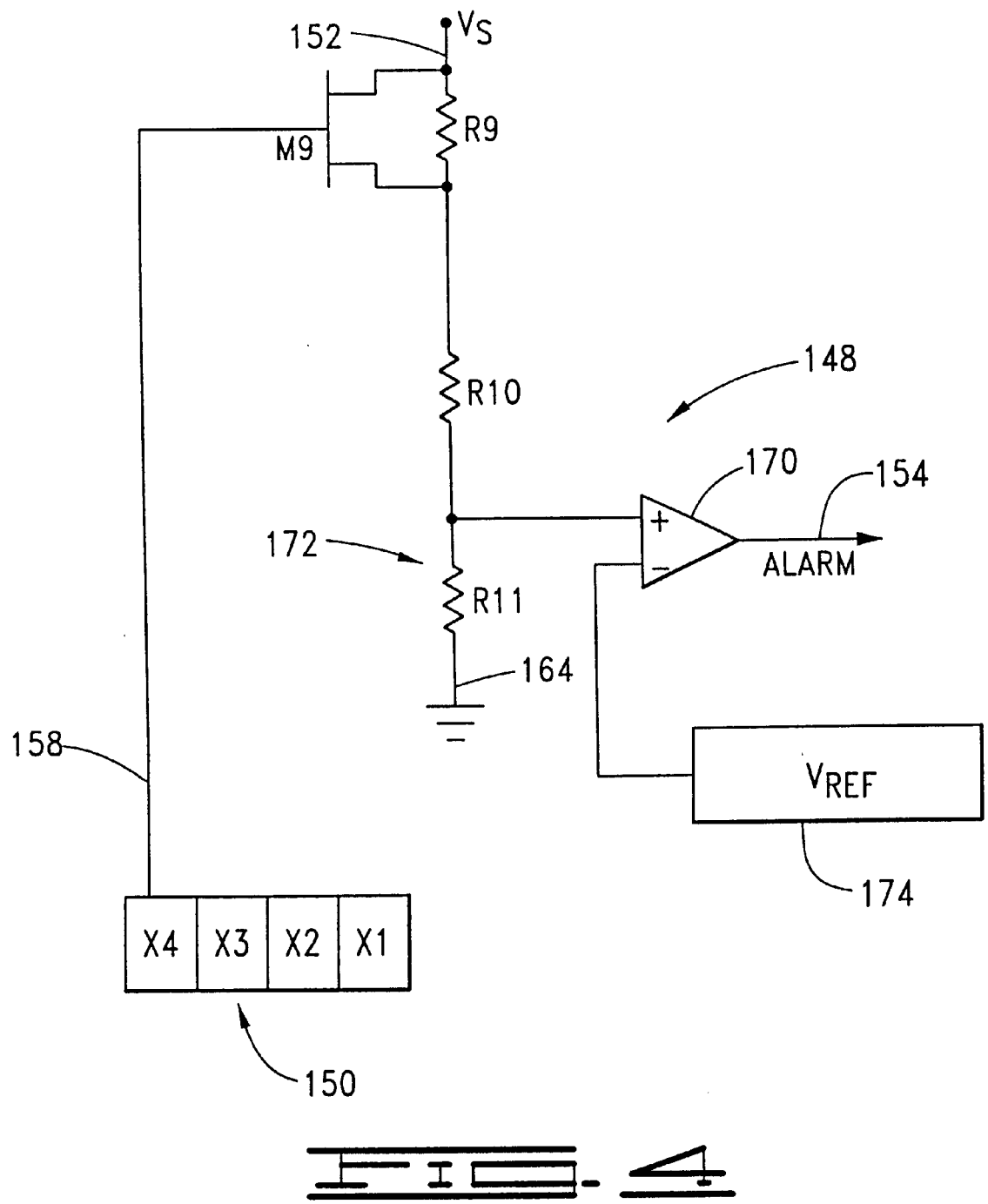
FIG. 4 is a generalized schematic diagram of a preferred embodiment of the voltage monitor circuit of FIG. 2.

Referring now to FIG. 4, shown therein is a preferred construction for the voltage monitor 148 of FIG. 2. Three resistors R9, R10 and R11 are connected as a voltage divider resistive network between the voltage Vs on path 152 and the ground terminal 164. A transistor M9 is connected in parallel across R9, with the gate of the transistor connected via path 158 to the X4 cell of the adjustment circuit 150.

A comparator 170 compares the voltage at a monitor node 172 between the R10 and R11 resistors with a reference voltage Vref from a reference voltage source 174. The values of the resistors and the reference voltage Vref are selected so that the comparator 170 generates the alarm signal on the path 154 when the voltage Vs varies from the nominal magnitude (e.g., +3.3 volts) by the selected output tolerance (e.g., –10% of +3.3 volts) during normal operation.

However, when the bit in the X4 cell is high, the transistor M9 provides a conductive path that bypasses the resistor R9, changing the monitor voltage at the monitor node 172. In this way, the selected output tolerance is adjusted to a different percentage of the nominal magnitude (e.g., –40% of +3.3 volts), so that the bit in the X4 cell serves as the aforementioned voltage monitor adjustment signal. Voltage margin testing can be performed accordingly without inadvertently resetting the voltage source 140 because of a detected undervoltage condition.

While the circuit of FIG. 4 has been provided to demonstrate output tolerances in one direction (i.e., negative thresholds), the circuit of FIG. 4 can be readily modified to provide both positive and negative output tolerances such as, for example, by replicating the circuit and using different resistor and voltage reference Vref values. Other configurations for the voltage monitor 148 are also readily contemplated, such as circuits that use voltage references at various levels that are selected as desired to provide the desired thresholds, circuits that specifically differentiate between voltage margin testing and normal operation so as to provide larger tolerance ranges for voltage margin testing as compared to normal operation with an adjusted source voltage Vs, and circuits that provide different tolerance ranges for different amounts of adjustment in the voltage Vs.

Figure 5:
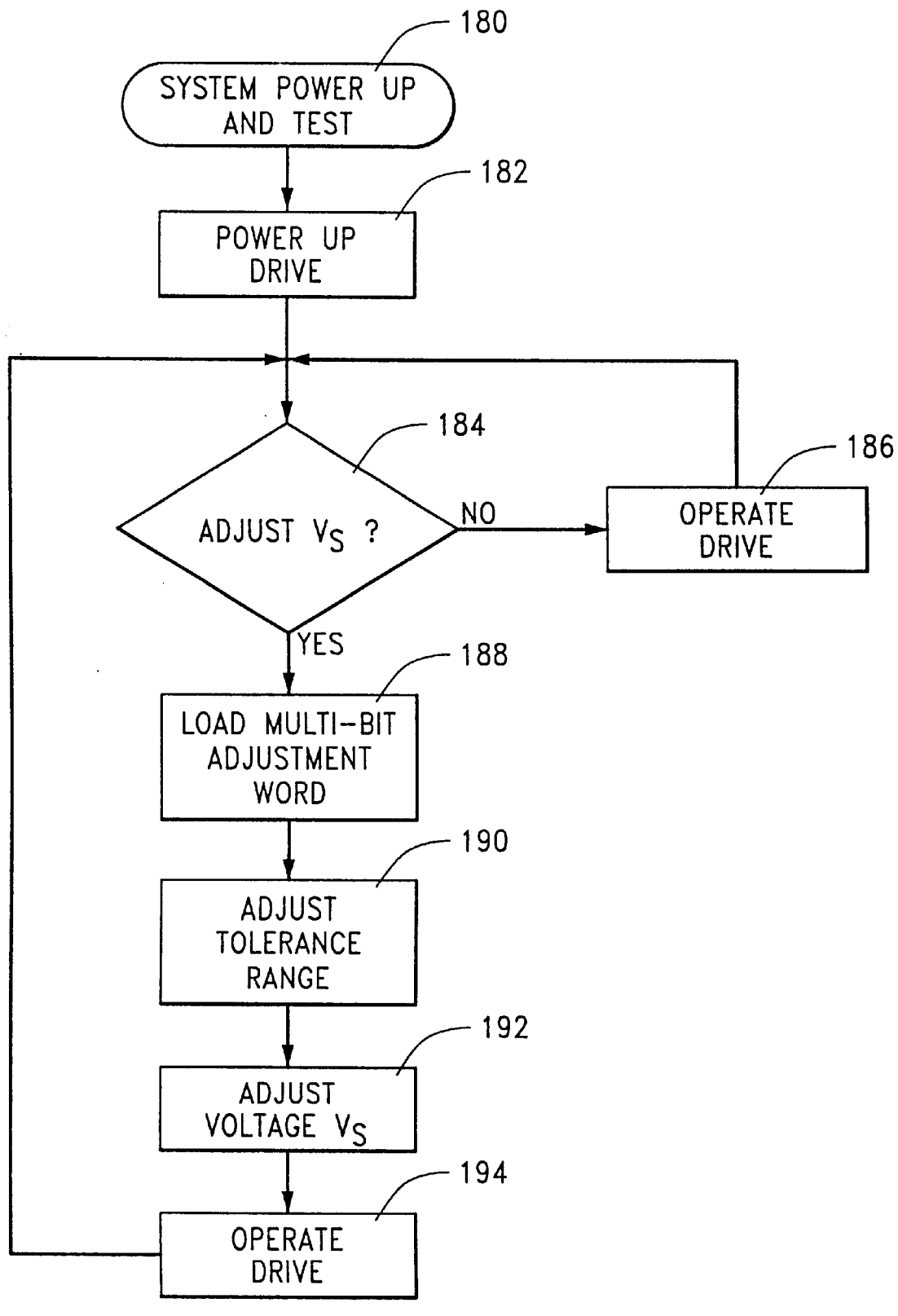
FIG. 5 provides a flow chart for a POWER UP AND TEST routine, representative of steps carried out during the operation of the circuit of FIG. 2.

FIG. 5 provides a SYSTEM POWER UP AND TEST routine 180, illustrative of steps carried out in accordance with preferred embodiments of the present invention. At step 182, the hard disc drive 100 is powered up in a conventional manner. During this step, the control processor 134 loads a command input with a low logic value in the X4 cell of the adjustment circuit 150 so that the voltage source 140 outputs the voltage Vs at the nominal magnitude.

Decision step 184 inquires whether a change in the magnitude of the voltage Vs is desired. If not, the flow passes to step 186 where the disc drive 100 is operated normally. The flow is shown to loop back to decision step 184 to represent that the voltage Vs can be subsequently adjusted after a period of normal operation.

When a change in the magnitude of the voltage Vs is desired, the flow continues from decision step 184 to step 188, wherein the control processor 134 loads the appropriate multi-bit command word into the adjustment circuit 150 as discussed above. This results in the transmission of the voltage monitor adjustment signal to the voltage monitor 148 to adjust the tolerance range, step 190, and in the transmission of the voltage regulator adjustment signal to the voltage regulator 146 to adjust the magnitude of the voltage Vs, step 192. As shown by step 194, the disc drive 100 is thereafter operated with the adjustments of steps 190, 192 until further adjustments in the voltage Vs are desired, at which point the routine loops back to decision step 184.

In summary, the present invention is directed to an apparatus and method for performing voltage margin testing in an integrated circuit device, such as an application specific integrated circuit (ASIC) 142 used in a disc drive 100. In accordance with preferred embodiments, the ASIC device 142 is provided with an embedded voltage source 140 having a voltage regulator 146 which outputs a regulated analog voltage at a nominal magnitude, such as +3.3 volts. A voltage monitor 148 provides an indication when the regulated analog voltage varies from the nominal magnitude by an output tolerance range determined as a first selected percentage of the nominal magnitude, such as –10% of +3.3 volts.

An adjustment circuit 150 applies a voltage regulator adjustment signal (on path 156) to the voltage regulator 146 to adjust the regulated analog voltage by a second selected percentage of the nominal magnitude (such as –5% of +3.3 volts). The adjustment circuit 150 further provides a voltage monitor adjustment signal (on path 158) to the voltage monitor 148 to concurrently adjust the output tolerance range to a third selected percentage of the nominal magnitude different from the first selected percentage (such as –40% of +3.3 volts). In this way, voltage margin testing can be readily performed on remaining circuitry internal to the device without inadvertently resetting the voltage source 140 because of a detected undervoltage (or overvoltage) condition.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An integrated circuit device, comprising:

an embedded voltage regulator which outputs a regulated analog voltage having a nominal magnitude;

an embedded voltage monitor, coupled to the voltage regulator, which provides an indication when the regulated analog voltage varies from the nominal magnitude by an output tolerance range determined as a first selected percentage of the nominal magnitude; and an embedded adjustment circuit which provides a voltage regulator adjustment signal to the voltage regulator to adjust the regulated analog voltage by a second selected percentage of the nominal magnitude, and provides a voltage monitor adjustment signal to the voltage monitor to concurrently adjust the output tolerance range to a third selected percentage of the nominal magnitude different from the first selected percentage.

2. The integrated circuit device of claim 1, wherein the adjustment circuit comprises a register configured to receive a multi-bit digital word, wherein the voltage regulator adjustment signal is generated in relation to a value of at least one bit of the multi-bit digital word, and wherein the voltage monitor adjustment signal is generated in relation to a value of at least one other bit of the multi-bit digital word.

3. The integrated circuit device of claim 2, wherein the voltage regulator comprises:
   an input voltage source;
   a voltage divider resistive network coupled to the input voltage source which generates a setpoint voltage as a portion of the input voltage source at a setpoint node of the voltage divider resistive network; and
   a switching regulator, coupled to the setpoint node, which generates the regulated analog voltage from the setpoint voltage, wherein the voltage regulator adjustment signal modifies the setpoint voltage to adjust the magnitude of the regulated analog voltage generated by the switching regulator.

4. The integrated circuit device of claim 2, wherein the voltage monitor comprises:
   a voltage divider resistive network coupled to receive the regulated analog voltage from the voltage regulator and generate a monitor voltage as a portion of the regulated analog voltage at a monitor node of the voltage divider resistive network; and
   a comparator, coupled to the monitor node, which compares the monitor voltage to a reference voltage and generates an alarm signal when a magnitude of the monitor voltage exceeds the reference voltage, wherein the voltage monitor adjustment signal modifies the monitor voltage at the monitor node by adjusting resistance characteristics of the voltage divider resistive network.

5. The integrated circuit device of claim 1, wherein the nominal magnitude of the regulated analog voltage is substantially +3.3 volts.

6. The integrated circuit device of claim 1, wherein the integrated circuit device is an application specific integrated circuit configured for use in a disc drive, wherein the application specific integrated circuit houses additional embedded circuitry used by the disc drive, and wherein the regulated analog voltage comprises a source voltage used to supply power to the additional embedded circuitry.

7. A disc drive, comprising:
   a rotatable data storage disc;
   a control processor that controls transfer of data between the data storage disc and a host computer associated with the disc drive; and
   an integrated circuit device, coupled to the control processor, housing an embedded voltage source that supplies power to the control processor, the voltage source comprising a voltage regulator, a voltage monitor and an adjustment circuit, the voltage regulator configured to output a regulated analog voltage at a nominal magnitude, the voltage monitor configured to provide an indication when the regulated analog voltage varies from the nominal magnitude by an output tolerance range determined as a first selected percentage of the nominal magnitude, wherein the control processor applies a command signal to the adjustment circuit to adjust the regulated analog voltage by a second selected percentage of the nominal magnitude, and to concurrently adjust the output tolerance range to a third selected percentage of the nominal magnitude different from the first selected percentage.

8. The disc drive of claim 7, wherein the adjustment circuit applies a voltage regulator adjustment signal to the voltage regulator to adjust the regulated analog voltage and applies a voltage monitor adjustment signal to adjust the output tolerance range, wherein the command signal is characterized as a multi-bit digital word, wherein the voltage regulator adjustment signal is generated in relation to a value of at least one bit of the multi-bit digital word, and wherein the voltage monitor adjustment signal is generated in relation to a value of at least one other bit of the multi-bit digital word.

9. The disc drive of claim 8, wherein the voltage regulator comprises:
   an input voltage source;
   a voltage divider resistive network coupled to the input voltage source which generates a setpoint voltage as a portion of the input voltage source at a setpoint node of the voltage divider resistive network;
   a switching regulator, coupled to the setpoint node, which generates the regulated analog voltage from the setpoint voltage, wherein the voltage regulator adjustment signal modifies the setpoint voltage to adjust the magnitude of the regulated analog voltage generated by the switching regulator.

10. The disc drive of claim 8, wherein the voltage monitor comprises:
    a voltage divider resistive network coupled to receive the regulated analog voltage from the voltage regulator and generate a monitor voltage as a portion of the regulated analog voltage at a monitor node of the voltage divider resistive network; and
    a comparator, coupled to the monitor node, which compares the monitor voltage to a reference voltage and generates an alarm signal when a magnitude of the monitor voltage exceeds the reference voltage, wherein the voltage monitor adjustment signal modifies the monitor voltage at the monitor node by adjusting resistance characteristics of the voltage divider resistive network.

11. The disc drive of claim 7, wherein the nominal magnitude of the regulated analog voltage is substantially +3.3 volts.

12. The disc drive of claim 7, wherein the integrated circuit device houses additional embedded circuitry used to control operation of the disc drive, and wherein the embedded voltage source further supplies power to the additional embedded circuitry.

13. A method for generating a regulated analog source voltage of selected magnitude in an integrated circuit device, comprising steps of:
    (a) providing an embedded voltage source in an integrated circuit device, the voltage source comprising a voltage regulator, a voltage monitor connected to the voltage regulator, and an adjustment circuit connected to the voltage regulator and the voltage monitor, wherein the voltage regulator is configured to output the regulated analog voltage at a nominal magnitude, and wherein the voltage monitor is configured to provide an indication when the regulated analog voltage varies from the nominal magnitude by an output tolerance range determined as a first selected percentage of the nominal magnitude; and (b) applying a command signal to the adjustment circuit to adjust the regulated analog voltage by a second selected percentage of the nominal magnitude, and to concurrently adjust the output tolerance range to a third selected percentage of the nominal magnitude different from the first selected percentage.

14. The method of claim 13, wherein the command signal is characterized as a multi-bit digital word, and wherein the applying step (b) comprises steps of:

(b1) generating a voltage regulator adjustment signal in relation to a value of at least one bit of the multi-bit digital word;

(b2) supplying the voltage regulator adjustment signal to the voltage regulator;

(b3) generating a voltage monitor adjustment signal in relation to a value of at least one other bit of the multi-bit digital word; and (b4) supplying the voltage monitor adjustment signal to the voltage monitor.

* * * * *